United States Patent [19]

Suzuki et al.

[11] Patent Number: 4,652,119
[45] Date of Patent: Mar. 24, 1987

[54] RANGE FINDER

[75] Inventors: Kiziro Suzuki, Hamura; Seiichi Isoguchi; Koji Watanabe, both of Hachioji; Shotaro Yokoyama; Takashi Nishibe, both of Yokosuka, all of Japan

[73] Assignees: Konishiroku Photo Industry Co., Ltd.; Fuji Electric Company Ltd.; Fuji Electric Corporate Research and Development Ltd., all of Japan

[21] Appl. No.: 571,846

[22] Filed: Jan. 18, 1984

[30] Foreign Application Priority Data

Jan. 21, 1983 [JP] Japan ................................. 58-7275

[51] Int. Cl.⁴ ..................... G01C 3/00; G01C 5/00; G03B 3/00; G03B 13/18
[52] U.S. Cl. .................................. 356/1; 354/402; 354/406; 354/407; 354/408

[58] Field of Search .............. 356/1; 354/406, 407, 354/408, 402

[56] References Cited

U.S. PATENT DOCUMENTS

| 3,945,023 | 3/1976 | Stauffer | 356/1 |
| 4,004,852 | 1/1977 | Pentecost | 356/1 |
| 4,078,171 | 3/1978 | Stauffer | 354/408 |
| 4,189,232 | 2/1980 | Asano et al. | 356/1 |

Primary Examiner—Stephen C. Buczinski
Attorney, Agent, or Firm—Jordan B. Bierman

[57] ABSTRACT

A range finder wherein the quantization of analog outputs from light receptor elements for converting an optical image into an electrical signal is accomplished by comparing the outputs from at least two of the light receptor elements in each group, by dividing the outputs into the following three cases: one output is greater than the other; both are equal; and one is smaller than the other.

12 Claims, 14 Drawing Figures

PRIOR ART  FIG. 1
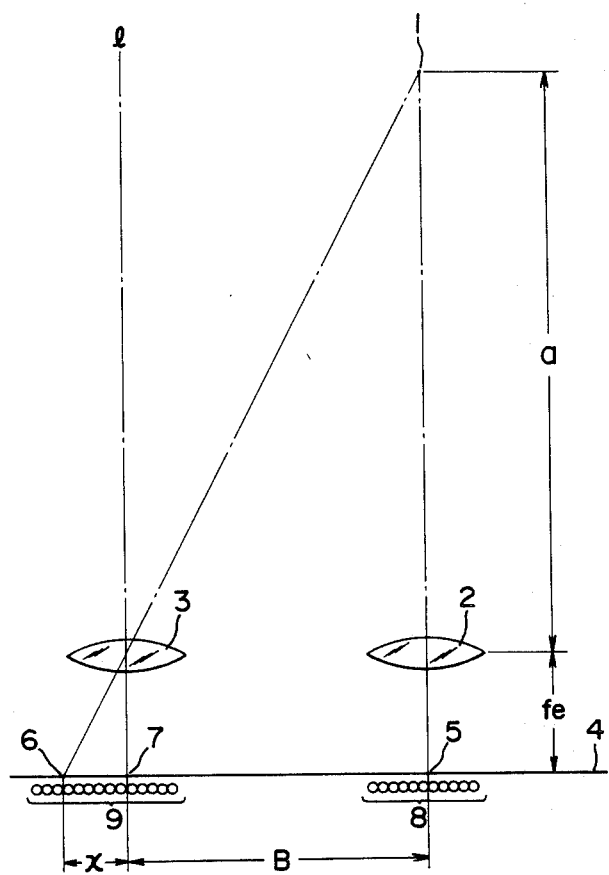

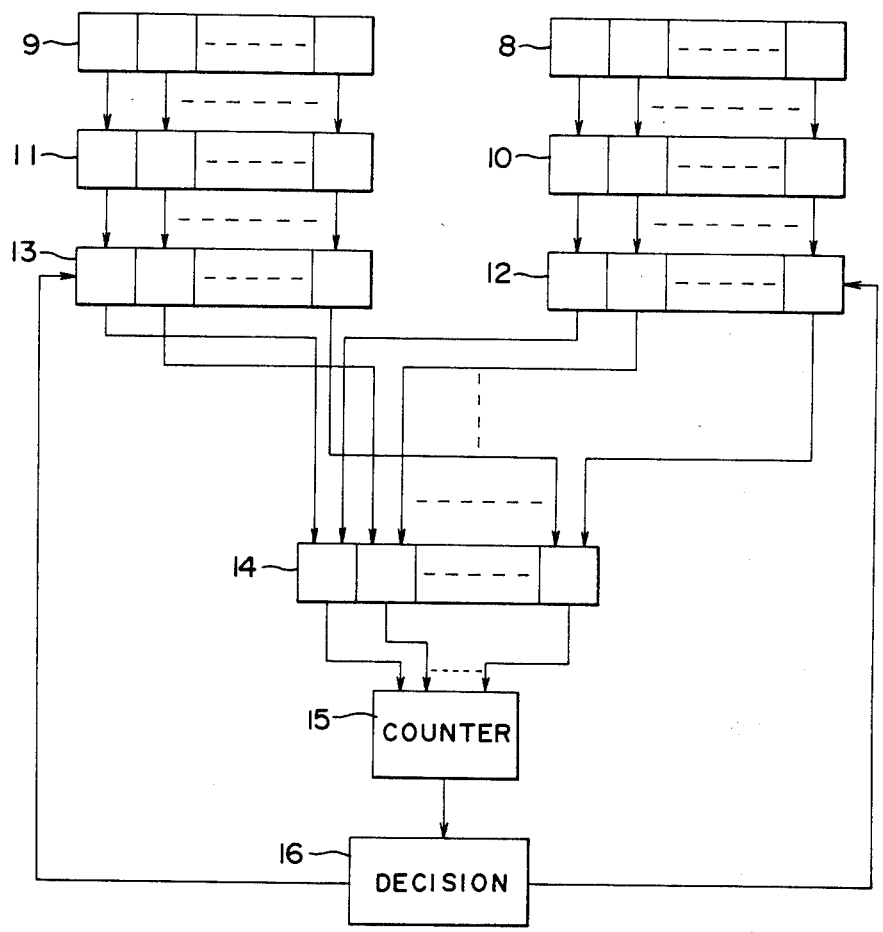
PRIOR ART FIG. 2

F I G. 7(a)
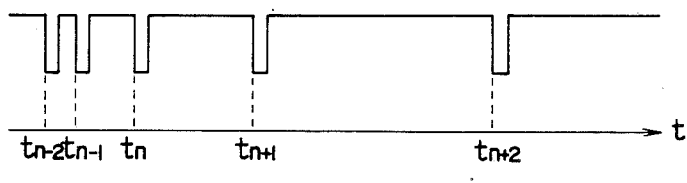
F I G. 7(b)
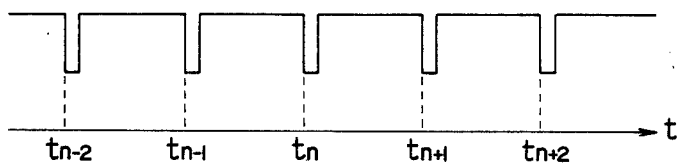

RANGE FINDER

BACKGROUND OF THE INVENTION

1. Field of the Invention

This invention relates to a range finder that can be adapted to an optical device such as an auto-focus camera.

2. Description of the Prior Art

The principle of range or distance determination in a conventional range finder is illustrated in FIG. 1 of the accompanying drawings, in which numeral 1 designates object, 2 and 3 lenses, 4 focal plane of the lenses, 5, 6 and 7 images, 8 a first train of light receptor elements, and 9 a second train of light receptor elements.

The object 1 forms its images 5 and 6 on the focal plane 4 through the respective lenses 2 and 3. In case the object 1 is at infinity, the light ray therefrom, which is incident on the lens 3, passes along the optical pass l to form an image 7 on the focal plane 4. Therefore, if the interval x between the two images 6 and 7 can be detected, the distance a to the object 1 can be determined from the following equation, by making use of the known triangulation techniques:

$$a = \frac{f_e B}{x} \quad (1)$$

wherein $f_e$ is the focal length of the lenses 2 and 3, and B is the distance between the optical axes of the respective lenses 2 and 3. For obtaining a clear image on the focal plane, the focal length $f_e$ is set so as to satisfy the relation of $f_e << a$. Usually, the object image 7 at an infinite distance is unaccessible, so that in this case the image 5 formed by the lens 2 is used. For determining the positions of or the interval between these images, a first and a second train of light receptor elements 8 and 9 are disposed in the neighborhood of the positions where the respective images are formed on the focal plane 4 by the lenses 2 and 3, and in these trains of light receptor elements, those elements which form the same image point with the object being supposed to be at an infinite distance are considered as pairing elements, and said distance determination is made from the correlation or comparison of the outputs of said respective receptor elements based on said pairing elements.

FIG. 2 is a block diagram illustrating the mechanism of a range finder which has been commonly used for determining the interval x between the object image 7 at an infinite distance such as mentioned above and the real image 6. In this diagram, numerals 8 and 9 designate the trains of light receptor elements same as shown in FIG. 1, 10 and 11 a series of binary-coding circuits, 12 and 13 shifts registers, 14 a series of coincidence detection circuits, 15 a counter, and 16 a decision circuit. The analog outputs of the respective light receptor elements in the trains 8 and 9 are discriminated either "0" or "1" on a pertinent threshold level by the binary-coding circuits 10 and 11 and written in the shift registers 12 and 13. 12 and 13 may not necessarily be shift registers, but it is desirable that at least one of them is a shift register. The outputs of the respective bits of these shift registers 12 and 13 are applied to the coincidence detection circuit series 14 in a predetermined combination such as mentioned before. Each circuit in said coincidence detection circuit series 14 generates "1" when the two inputs are same and "0" when they are different. Of the outputs of the coincidence detection circuit series 14, the number of "1" is counted by the counter 15 and given to the decision circuit 16. The decision circuit 16 stores this number, and then it shifts the shift register 12 or 13 and again reads and stores the output of the counter 15. Such shifting of the shift registers 12, 13 and reading/storing of the counter outputs are repeated a predetermined number of times, and the greatest of the counter readings stored is determined. Here, the images on the respective receptor element trains 8 and 9 have the greatest coincidence, and the number of times of shifting of the shift register from the initial state at which said maximum coincidence is given corresponds to x. In such case, however, if the outputs of the receptor elements are processed directly, there is a risk of misoperation due to noise or variations of elements.

FIG. 3 is the diagrams for illustrating the influence of noise on the receptor element output. In the diagrams, the element position is plotted as abscissa and the element output as ordinate.

No serious problem arises in case the noise is superposed at a same rate on both of the output waveform of the receptor element train 8 such as shown in FIG. 3(a) and the output waveform of the receptor element train 9 such as shown in FIG. 3(b), but in case an offset or ramp type noise as shown in FIG. 3(c) or FIG. 3(d) is superposed on the output waveform of one of the receptor element trains, for example, the train 9, the whole or a substantial portion of the output value rises above the threshold as shown in FIG. 3(e) or FIG. 3(f), so that if the two are compared in this state, a misjudgement will surely be committed.

Hitherto, the binary-coding circuit for the outputs of the light receptor elements has been constructed, for instance, as follows.

FIG. 4 is a circuit diagram exemplifying such conventional binary-coding circuit. In the diagram, only a circuit for one bit is shown, but actually such unitary circuits are provided a desired number to form a binary-coding circuit train corresponding to the train of light receptor elements. In the drawing, numeral 17 refers to a photo diode (light receptor element), 18 and 19 switching transistors, 20 a capacitor, and 21 an inverter.

In operation, first the switching transistor 18 is turned on by CLEAR input to effect discharge of the capacitor C. Then, said switching transistor 18 is turned off by CLEAR input while the switching transistor 19 is turned on by input G. Concequently, a current i substantially proportional to the light intensity flows into the capacitor 20 from the photo diode 17 through said switching transistor 19. Upon passage of a certain period of time t after energization of the switching transistor 19, the input G is operated to deenergize the switching transistor 19. At this point, the capacitor 20 is loaded with an electric charge of about i×t, and as a consequence, a voltage of $Vin = it/C$ is applied to the input of the inverter 21. Supposing the threshold voltage of the inverter 21 is Vth, the inverter output value is "0" if $Vin \geq Vth$ and "1" if $Vin < Vth$. Such change of output value according to the relation between Vin and Vth can be reversed by connecting another inverter next to said inverter 21. What is important here is the conduction time t of the switching transistor 19. If such conduction time is too long, the capacitor 20 is overcharged and the inverter input exceeds the threshold voltage in all of the light receptor elements, while if said conduction time is too short, the capacitor 20 is little charged and hence the inverter input can not exceed the threshold voltage in any receptor element. Thus, if the binary coding is accomplished without giving consideration to the time t, only a pattern of whole "0" or whole "1" is provided and no information can be obtained. Therefore, the optimal control of the time t must be made by giving consideration to the amount of light received by the whole train of light receptor elements, but this type of control is generally complicated and troublesome.

SUMMARY OF THE INVENTION

The present invention has been made in consideration of said problems in the prior art, and it has for its object to provide a range finder which is substantially free of the influence of noise and variation of elements and which requires no complicate control.

A prominent feature of this invention resides in that the quantization of the analog outputs from the light receptor elements for converting an optical image into an electrical signal is accomplished not by comparing with a predetermined logical level as in the prior art but by comparing the outputs from at least two of the light receptor elements in each group, by dividing the outputs into the following three cases: one output is greater than the other; both are equal; and one is smaller than the other. By performing said quantization in this way, it is possible to eliminate the influence of noise, etc., more effectively and with a more simple circuitry than with the prior art.

Now, the method of dividing the analog output waveform from the light receptor elements into said three patterns, that is, the principle of this invention will be described.

FIG. 5 is a diagram for illustrating such principle of this invention. Supposing that the outputs from one group of the light receptor (converter) elements can be expressed as in FIG. 5(a), there exist the following three patterns of inclination of waveform: the inclination is "upward rightwise" (increasing tendency), that is, when comprising two light receptor element outputs, the receptor element output on the right side is greater than that on the left side, represented by $UP_1$–$UP_3$; the inclination is "downward rightwise" (decreasing tendency, where the element output on the right side is smaller than that on the left side), represented by $DN_1$–$DN_2$; and the inclination is "zero" (the curve is substantially flat, where the element output on the right side is substantially equal to that on the left side), represented by $FT_1$–$FT_4$. Thus, if the waveform is expressed by combining the output conditions q1, q2 and q3 of three different flipflops Q1, Q2 and Q3 in accordance with said three patterns of waveform inclination described as "upward rightwise", "downward rightwise" and "flat", it is possible to accomplish the quantization in the way shown in FIG. 5(b). According to this quantization formula, even if an offset or small ramp type output is superposed as explained in FIG. 3, it is considered that the influence thereof will scarcely extend to the condition of inclination, and thus it is possible to drastically decrease the influence of noise, etc. Many literatures are available regarding the process after the quantization of the receptor element outputs, and such process has no direct bearing on the present invention, so that no specific description on such process is given here.

The other objects and features of this invention will be made clear as the description of this invention further proceeds hereinafter in conjunction with the accompanying drawings.

BRIEF DESCRIPTION OF THE DRAWINGS

FIG. 1 is a schematic drawing illustrating the distance measuring principle according to a triangulation method.

FIG. 2 is a block diagram showing a conventional range finder.

FIGS. 7(a) and 7(b) are diagrams showing the strobe signal waveforms in the circuit of FIG. 6.

DESCRIPTION OF THE PREFERRED EMBODIMENTS

Hereinafter, an embodiment of this invention will be described with reference to FIG. 6 which is a structural diagram of an embodiment of this invention.

Figure 3A:
FIGS. 3(a) to 3(f) are drawings for illustrating the influence of offset or ramp type noise, etc., on the light receptor element outputs.
Figure 3D:
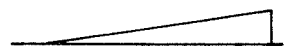
Figure 3B:
Figure 3E:
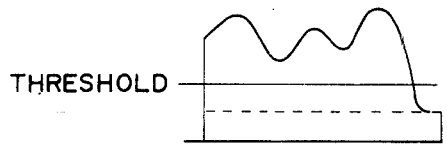
Figure 3C:
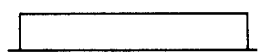
Figure 3F:
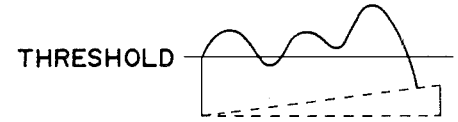
Figure 4:
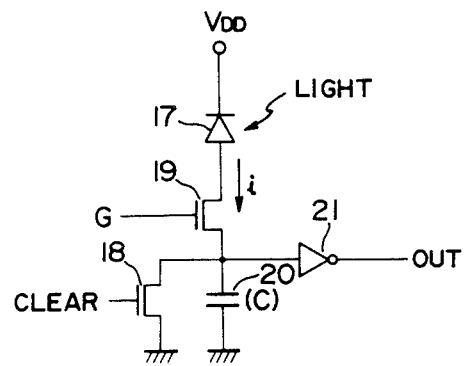
FIG. 4 is a diagram showing a binary-coding circuit for one bit.
Figure 5:
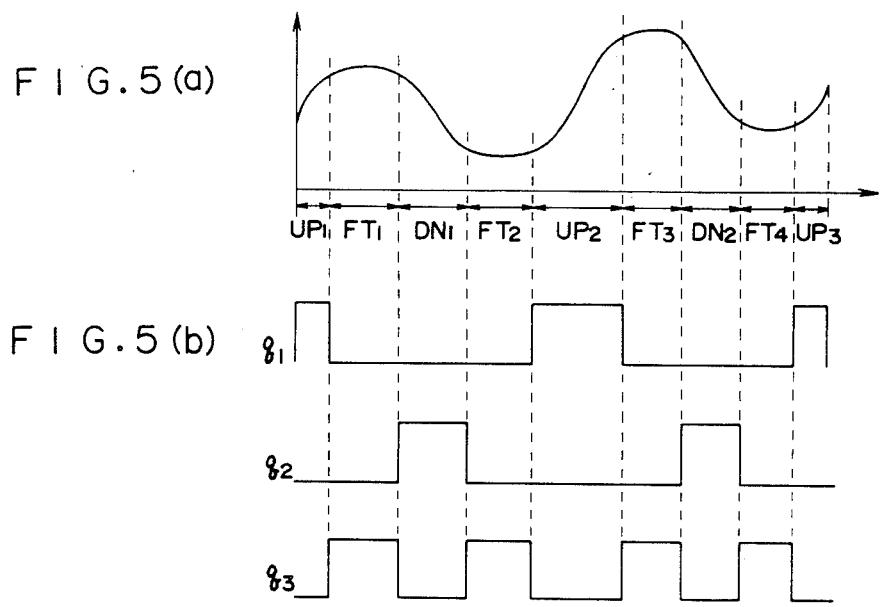
FIGS. 5(a) and 5(b) are diagrams for illustrating the principle of this invention.
Figure 6:
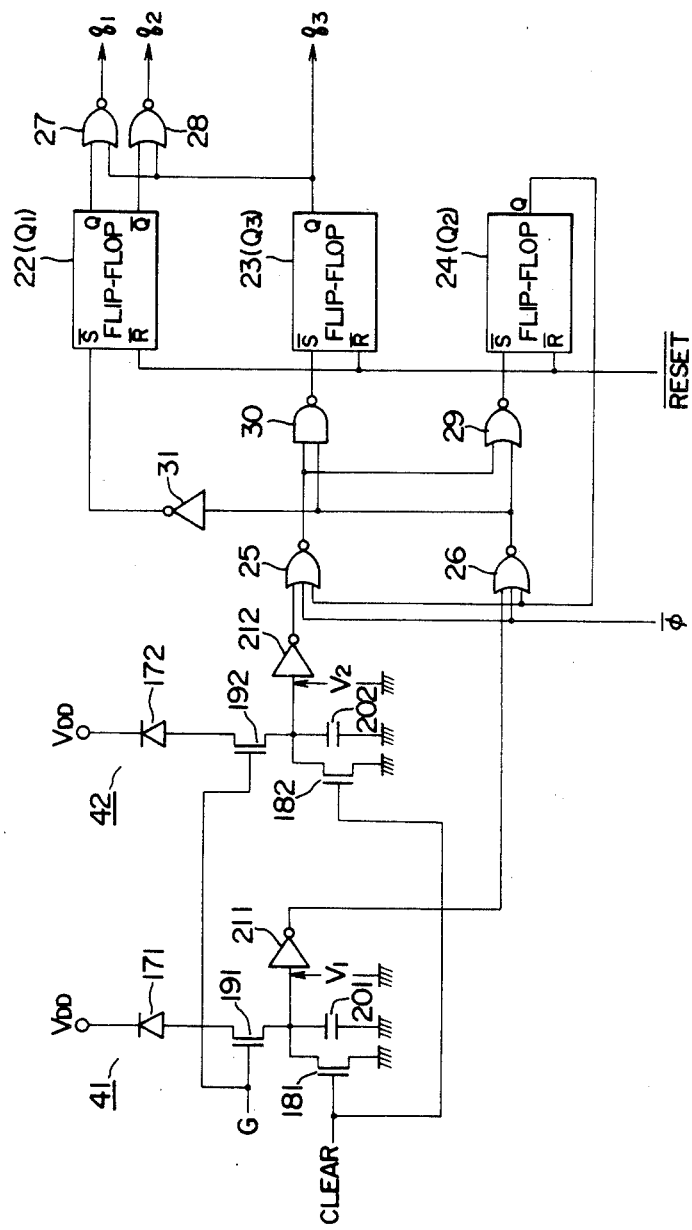
FIG. 6 is a circuit diagram showing an embodiment of this invention.

In the diagram of FIG. 6, numeral 41 (42) designates a converter element consisting of a photo diode 171 (172), switching transistors 181, 191 (182, 192), a capacitor 201 (202) and an inverter 211 (212); 22–24 flipflops, 25–29 NOR gates, 30 a NAND gate, and 31 an inverter. It will be understood that the converter elements 41 and 42 are shown as two adjoining elements or optionally selected two elements in one of the two groups of converter elements, and their structure is same as shown in FIG. 4. In the flipflops 22 (Q1), 23 (Q2) and 24 (Q3), when $\overline{S}$ ($\overline{SET}$) input is "0", the output Q ($\overline{Q}$) is set to give "1" ("0"), and when $\overline{R}$ ($\overline{RESET}$) input is "0", the output Q ($\overline{Q}$) is reset to give "0" ("1"). At the start of the operation, flipflops 22–24 are reset by a $\overline{RESET}$ signal concurrently with discharge of the capacitors 201 and 202 by CLEAR input, and the output Q ($\overline{Q}$) becomes "0" ("1"). The $\overline{RESET}$ input becomes "0" only when the output Q is set to "0" at the start of the operation, and thereafter it remains set to "1". $\overline{\phi}$ is a pulse signal of "0" having a fixed or variable time interval (such pulse signal being hereinafter referred to as strobe signal), and the control of such time interval is made by a controller not shown. NOR gates 25, 26 give a signal which is significant only when the Q output of the flipflop 24 is "0" and also the strobe signal $\overline{\phi}=0$, that is, the outputs from the inverters 211, 212 are reversed by this signal. Thus, it should be considered that the strobe signal $\overline{\phi}$ is a signal for sampling the outputs of the respective converter elements 41, 42, and the circuits successive to NOR gates 25, 26 are operated synchronously with the signal $\overline{\phi}$. In the following discussion, therefore, the circuits are supposed to be in operation when the signal $\phi=0$. In the initial phase, the outputs of inverters 211, 212 are both "1" and hence the outputs of NOR gates 25, 26 are "0". Under this condition, the output Q of the flipflop 24 stays "0" because of initial resetting, but when the output of either of the inverter 211 or 212 has become "0", it is detected and the output Q is made "1", and the strobe signal $\phi$ given thereafter is made null. In other words, the output Q is made "0" by the "1" signal from the flipflop 24, irrespective of other input signal. To put it in other terms, when the input V1 of the inverter 211 exceeded the threshold voltage, or the input V2 of the inverter 212 exceeded the threshold voltage, or when both of them exceeded the threshold voltage at the same time, any succeeding outputs of the light receptor elements are supposed unseen. On the other hand, flipflop 23 detects that the output of a converter element is "flat". That is, when the outputs of inverters 211 and 212 become "0" with the same timing as strobe signal, the outputs of NOR gates 25, 26 both become "1" while the output of NAND gate 30 becomes "0" so that the flipflop 23 is set and its output Q becomes "1". Here, if the outputs of inverters 211, 212 are made "1" with different timing from strobe signal, the flipflop 24 is set with the initial timing and the "0" output at any succeeding timing is made null, so that the outputs of NOR gates 25 and 26 never become "1" at the same time and hence the output of NAND gate 30 does not become "0". Accordingly, the flipflop 23 won't be set and its output remains "0". The flipflop 22 detects whether the output of converter element is "upward rightwise" or "downward rightwise". Here, if it is supposed that the photo diode 171 is positioned on the right side relative to the photo diode 172 in the group of converter elements, it may be considered that if the output of inverter 211 is made "0" in advance of inverter 212, the output waveform pattern will be "downward rightwise", and in the opposite case, the output waveform pattern will be "upward rightwise". Supposing that the output of inverter 211 has become "0" earlier than inverter 212, the output of NOR gate 26 becomes "1" while the output of inverter 31 becomes "0", so that the flipflop 22 is set and its forward output Q becomes "1" and its reverse output $\bar{Q}$ becomes "0". Since the case where the outputs of inverters 211 and 212 become "0" at the same time is left out of consideration here, the output Q of flipflop 23 is "0" and hence NOR gates 27 and 28 give a forward output Q (q1) and a reverse output Q (q2), respectively, of the flipflop 22. In this case, that is, in case the output of inverter 211 is made "0" prior to the output of inverter 212, an output (q2) is obtained through NOR gate 28, and from this, it is known that the output waveform pattern is "downward rightwise". Conversely, in case the output of inverter 212 is made "0" in advance of inverter 211, the flipflop 24 is set and hence even if any succeeding output of inverter 211 becomes "0", the flipflop 22 can not be set, so that said flipflop 22 maintains its initial condition (Q="0", $\bar{Q}$="1") and the output of flipflop 23 also remains "0" as in the first-said case. In the latter case, therefore, an output (q1="1") is obtained from NOR gate 27 alone, and from this, it can be judged that the output waveform pattern is "upward rightwise". In case the outputs of both inverters 211 and 212 have become "0" with the completely same timing, flipflop 23 is set and its output q3 becomes "1" as said above, so that the outputs q1, q2 or NOR gates 27, 28 become "0" no matter whether flipflop 22 is set or reset. It will be also apparent from the foregoing explanation that the gates 191, 192 of the converter elements and the signal G for their control can be omitted.

Now, the controlling method for said strobe signal $\bar{\phi}$ will be described.

FIG. 7 is a diagram showing the waveform of strobe signal. If the minimum and maximum values of light volume (intensity) received by a receptor element differ excessively from each other, the conversion time of the converter element also changes greatly in accordance therewith. Thus, if the signal is strobed at the same time interval disregarding such variable conversion time, especially when the conversion time is long in which case the comparing operation is conducted a plural number of times, it merely serves to unnecessarily raise the precision with the result in weekening the resistance to noise.

The intensities of light received by two receptor elements are considered equal to each other only when both outputs of inverters 211 and 212 became "0" at a same strobe interval. So, if this strobe interval is extraordinarily short, it becomes almost impossible to detect the "equal" condition, and the significance of "equality" is lost. In other words, the intensities of light received by two receptor elements are converted respectively during the times $t_1$, $t_2$ in which the outputs of inverters 211 and 212 become "0". Thus, when the relationship of $\Delta t = t_1 - t_2$ with respect to two thresholds $T_1$, $T_2$ ($T_1 < 0 < T_2$) is, for example, $\Delta t < T_1$, the curve in FIG. 3 is "downward rightwise"; when the relationship is $T_1 \leq \Delta t \leq T_2$, the curve in FIG. 3 is "flat". On the other hand, when the relationship is $T_2 < \Delta t$, the curve in FIG. 3 is "upward rightwise". Here, if the values of two thresholds $T_1$, $T_2$ are not decided properly, the ensuing process will rather be hindered. Such problem can be eliminated by changing the strobe interval in accordance with the conversion time, so as to satisfy the following relation:

$$t_{n+1}/t_n = f(n) \text{ (f(n) is a function of n)}$$

where $t_n$ and $t_{n+1}$ are the times still n-th and n+1st runs of strobing are conducted from the start of operation. In case the range of variation of light volume is relatively narrow, the circuitry for satisfying the above-said relation is complicated, so, in this case, the strobe interval is changed so as to satisfy the relation:

$$t_{n+1} - t_n = f(n)$$

Thus, it will be easily understood that FIG. 7(a) represents the case where $t_{n+1}/t_n = k$ (k being a constant), and FIG. 7(b) represents the case where $t_{n+1} - t_n = k$ (k being a constant). As described above, according to this invention, the outputs from the series of light receptor (converter) elements are not binary-coded at a constant threshold level as in the prior art but quantized in conformity to the pattern of inclination of the output waveform, so that the range finder provided according to this invention is more tolerant of noise, has no necessity for a strict and complicate control of charging time of the capacitor charged by the current flowing to the receptor elements, and is therefore simple in structure and high in precision for its cost. Also, since it is possible to change the strobe interval according to the conversion time in the converter elements, the optimal determination according to the conversion time is made possible.

What is claimed is:

1. A range finder comprising a first and second optical means for receiving light from an object through different optical paths to form object images on a predetermined focal plane; first and second light receptor arrays for generating first and second electric signals, respectively, corresponding to intensity of light of the image; each of said arrays comprising a plurality of elements; a plurality of first converter elements, each of which corresponds to one of said first receptor elements; a plurality of second converter elements, each of which corresponds to one of said second receptor elements; said first and second converter elements generating integrated signals when said first and second electric signals are integrated to a predetermined value; a plurality of first quantization means, each of which receives signals from two of said first converter elements; a plurality of second quantization means, each of which receives signals from two of said second converter elements; said two first converter elements corresponding to said two second converter elements; said first and second quantization means detecting timing of the generation of two integrated signals, whereby a three-value output is obtained as to which integrated signal is generated first or whether these two signals are generated substantially at the same time; and a measuring means for measuring a distance to the object by a correlation of the three-value outputs generated from the quantization means.

2. The range finder of claim 1 wherein said quantization means comprises a sampling means for sampling ouput signals from said two converter elements periodically.

3. The range finder of claim 2 wherein the interval of time of said sampling is adjustable.

4. A range finder comprising a first and second optical means designed to receive light from an object through different optical paths to form object images on a predetermined focal plane; first and second groups of light receptor elements disposed in correspondence to said respective object images on said focal plane; said groups consisting of a predetermined number of light receptor elements designed to generate a photo electric current corresponding to the intensity of the received light; first and second groups of converter elements corresponding to said groups of light receptor elements which integrate the photo electric current of every light receptor element and convert the intensity into a signal which is generated in accordance with the time at which said integration reaches a predetermined value, whereby a distance to said object is measured from the correlation of the outputs of said groups of converter elements; a plurality of quantization means for each of said groups of light receptor elements; said quantization means detecting whether the received light intensity of one converter element between a predetermined two converter elements in the same group of converter elements is smaller than, substantially equal to or greater than the other converter element based on whether an output of one converter element is generated prior to the other, and said quantization means making a three-value output from the difference in value of the received light intensities, thereby correlating the outputs of said both groups of converter elements based on said three-value output.

5. The range finder according to claim 4 wherein said quantization means develops the three-value output from the difference in value of the received light intensities based on which converter element generates the output; the output of said converter element being sampled repeatedly with a predetermined time interval.

6. The range finder according to claim 4 wherein said quantization means has first and second flipflops which are reset at the initial state; said first flipflop being set when outputs are generated from said two converter elements; said second flipflop being set by either one of said outputs; and said three-value output being generated based on the outputs of said first and second flipflops.

7. The range finder according to claim 5 wherein said quantization means has first and second flipflops which are reset at the initial state; said first flipflop being set when outputs are generated from said two converter elements; said second flipflop being set by either one of said outputs; and said three-value output being generated based on the outputs of said first and second flipflops.

8. The range finder according to claim 5 wherein in said quantization means sampling time $t_n$ and $t_{n+1}$ from the initial state till the nth and n+1st sampling have the following relation:

$$t_{n+1} - t_n = f(n)$$

wherein f(n) is a function of n.

9. The range finder according to claim 8 wherein said function f(n) is given as:

$$f(n) = k \text{ (k: a constant)}.$$

10. The range finder according to claim 5 wherein in said quantization means sampling time $t_n$ and $t_{n+1}$ from the initial state till the nth and n+1st sampling have the following relation:

$$t_{n+1}/t_n = f(n) \text{ (f(n): a function of n)}.$$

11. The range finder according to claim 10 wherein said function f(n) is given as:

$$f(n) = k \text{ (k: a constant)}.$$

12. A range finder comprising a first and a second optical means designed to receive light from an object through different optical paths to form object images on a predetermined focal plane; first and second groups of light receptor elements disposed in correspondence to said respective object images on said focal plane; said groups consisting of a predetermined number of light receptor elements designed to generate a signal corresponding to the intensity of the received light, whereby a distance to said object is measured from the correlation of the outputs of said groups of converter elements; a plurality of quantization means being provided for said light receptor elements; said quantization means detecting whether the received light intensity of one converter element between a predetermined two converter elements in the same group of converter elements is smaller than, substantially equal to or greater than the other converter element; and said quantization means developing a three-value output from the difference in value of the received light intensities, thereby correlating the outputs of said both groups of converter elements based on said three-value output.

* * * * *